Figure 1:
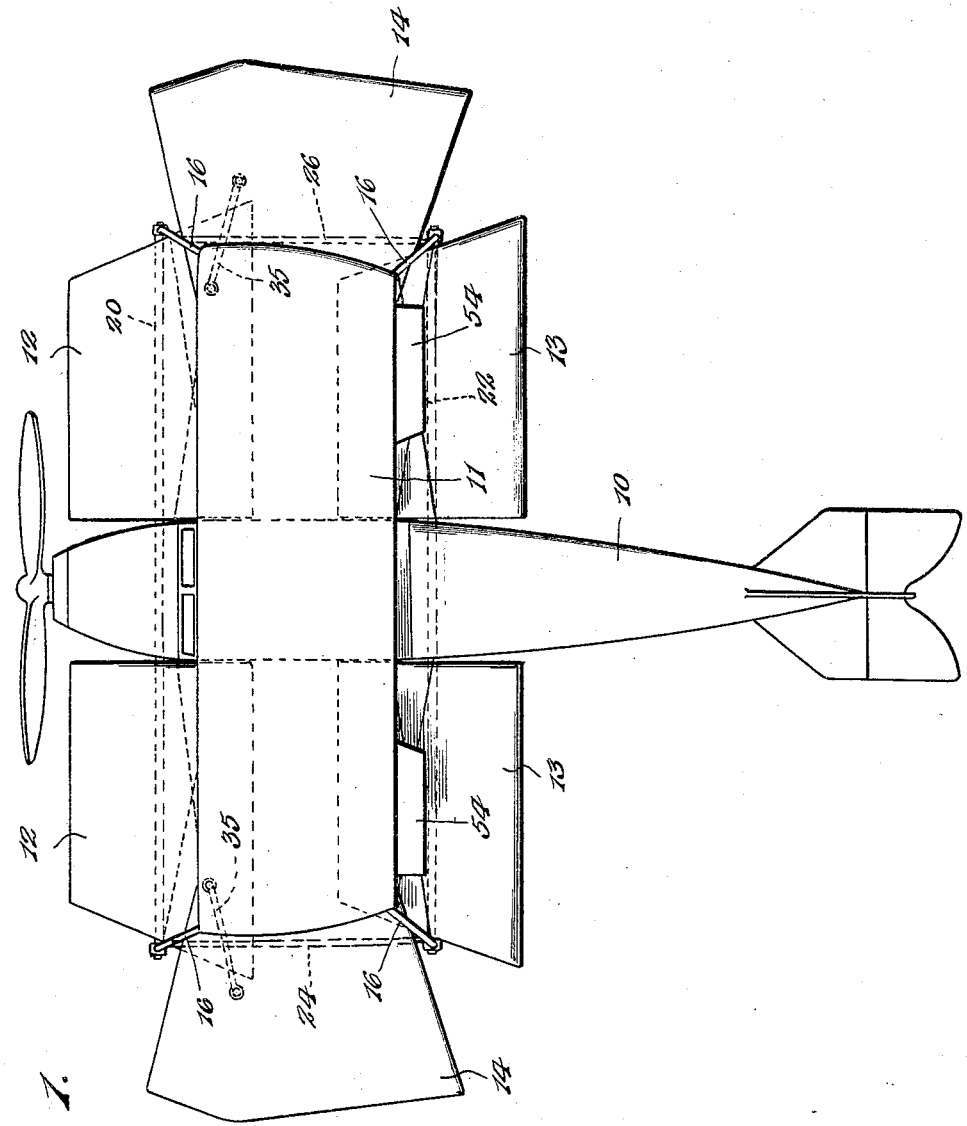

Aug. 16, 1932.  S. PALLOTTA  1,871,909
AIRPLANE
Filed June 22, 1931   5 Sheets-Sheet 2

Inventor
S. Pallotta.
By
Attorneys

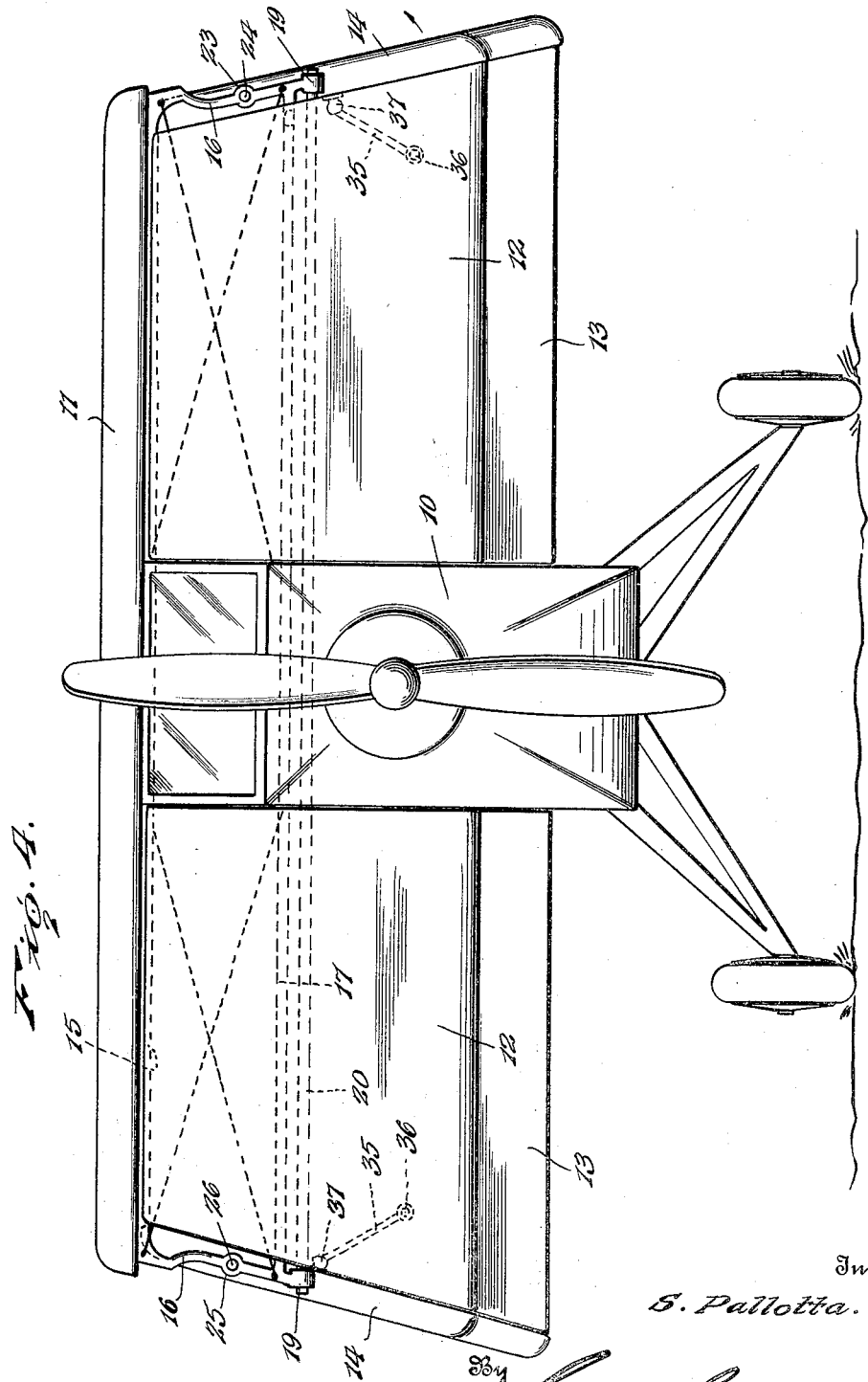

Aug. 16, 1932.    S. PALLOTTA    1,871,909
AIRPLANE
Filed June 22, 1931    5 Sheets-Sheet 4
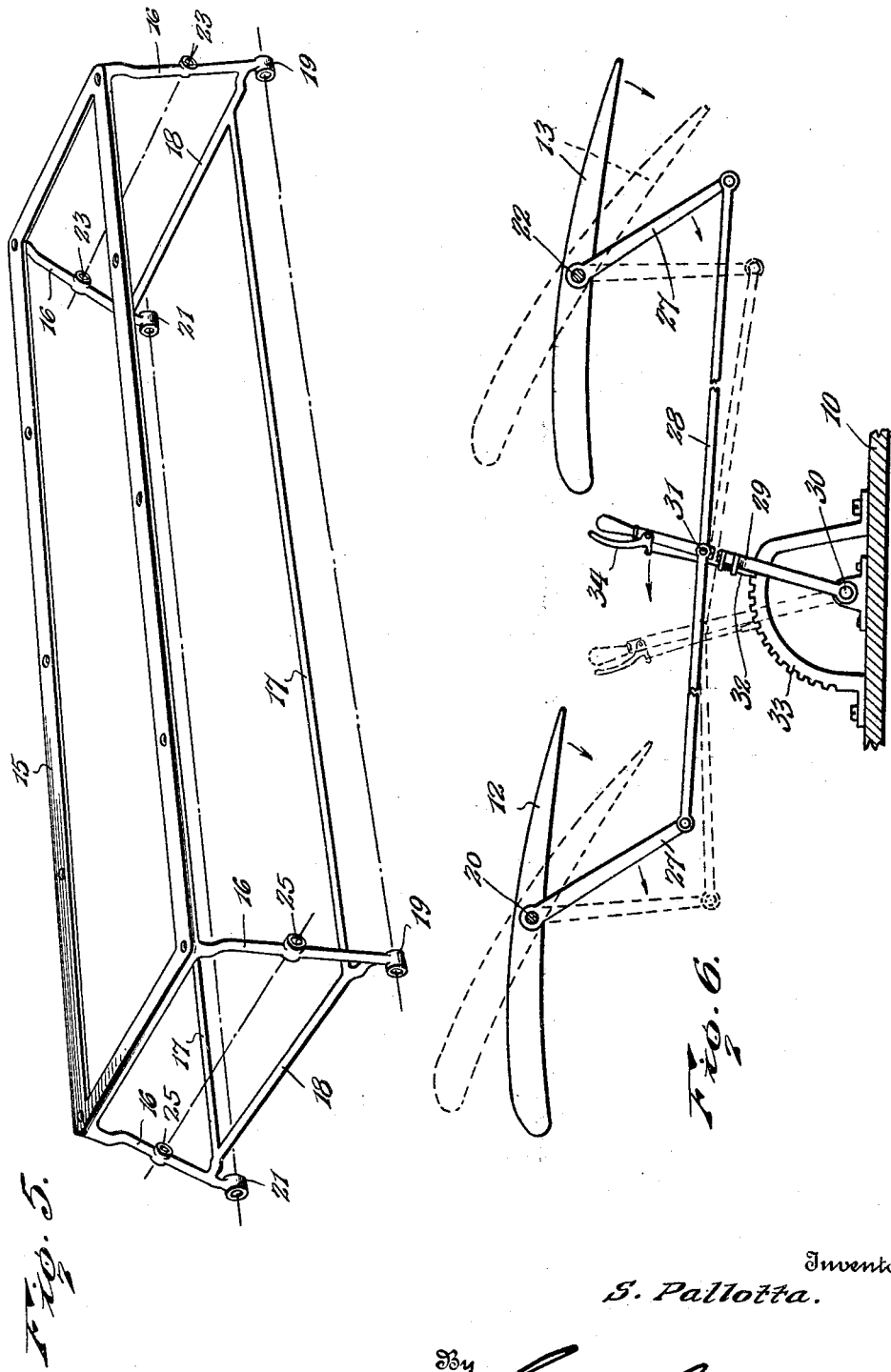
Inventor
S. Pallotta.
By
Lacey & Lacey Aug. 16, 1932.   S. PALLOTTA   1,871,909
AIRPLANE
Filed June 22, 1931   5 Sheets-Sheet 5
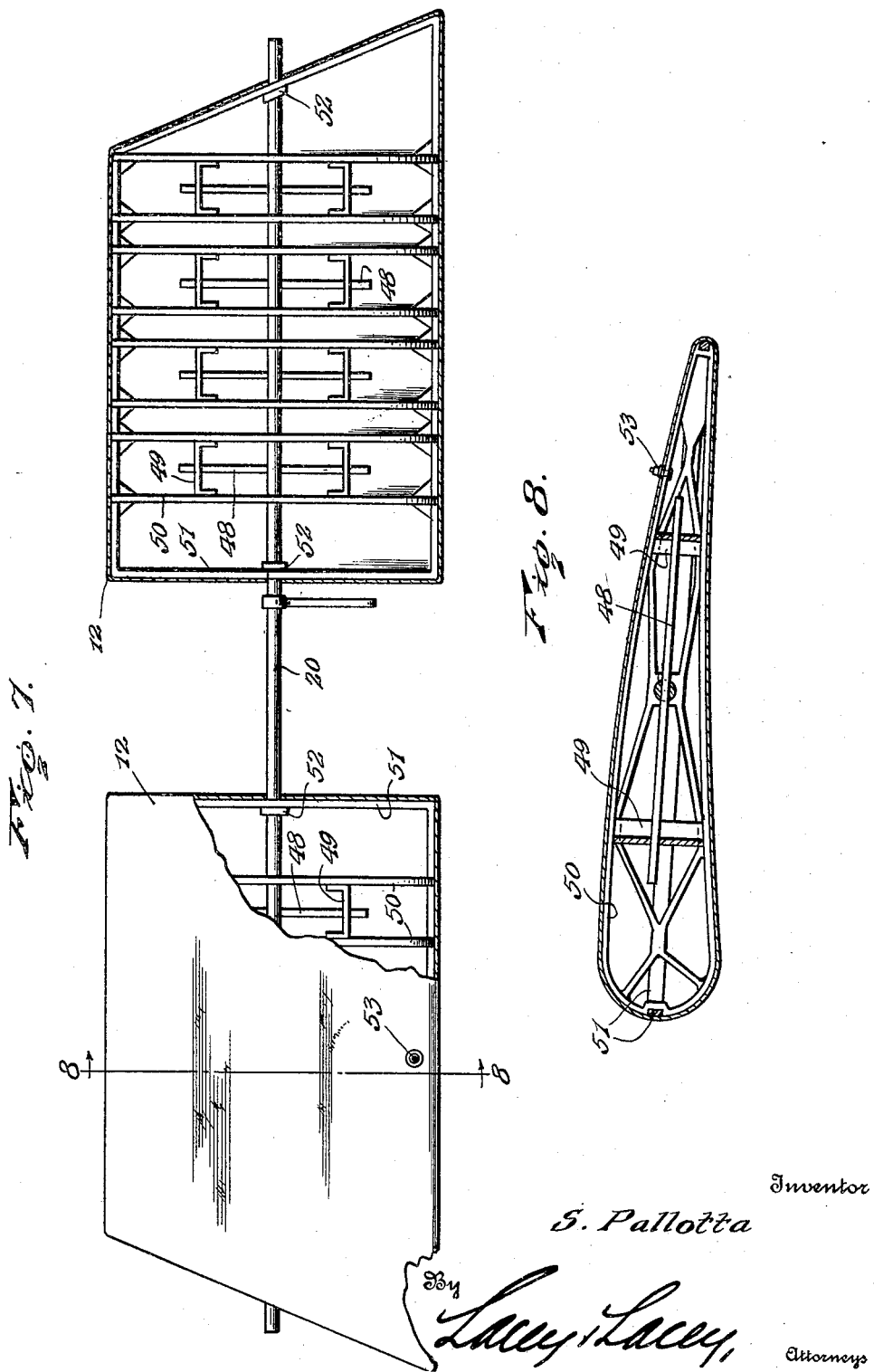
Inventor
S. Pallotta
By Lacey & Lacey,
Attorneys Patented Aug. 16, 1932

1,871,909

UNITED STATES PATENT OFFICE

SANDY PALLOTTA, OF YOUNGSTOWN, OHIO

AIRPLANE

Application filed June 22, 1931. Serial No. 546,075.

This invention relates to airplanes and has for an object to provide an airplane having a fixed sustaining wing and articulated sustaining wings, the latter being swingable at the will of the pilot to co-operate with the fixed wing in forming a box-like structure to function similar to a parachute and enable safe landings to be made in small areas in case of engine failure or when the need arises.

A further object is to provide an airplane in which the fuselage is provided with trap doors in the bottom adapted to be opened just prior to closing of the articulated wings to facilitate inflation of the entire fuselage as well as the folded wing structure so that quick response in producing the parachute effect will be promoted.

A still further object is to provide an airplane having a fixed sustaining wing rigidly secured above the fuselage and having front, rear and end sustaining wings at a lower level than the fixed wing adapted to coact with the fixed wing, under ordinary flying conditions, in sustaining the airplane and which may be folded downwardly below the fixed wing at the will of the pilot in case of engine failure or a desire on the part of the pilot to descend vertically to a particular landing place and form an open bottom box-like structure transversely of the fuselage to stabilize the airplane and retard descent thereof.

A still further object is to provide novel means for simultaneously swinging the articulated wings to flying position or to parachute position instantly, when the need arises, the various wings being strengthened beyond ordinary practice to provide adequate rigidity of both the wings and operating means therefor to withstand the forces set up when closing the wings to form the parachute.

A still further object is to provide certain or all of the wings with means for inflating them with helium gas, if desired, to reduce the dead weight of the craft and promote proper balancing thereof in order to insure the craft remaining on substantially an even keel when emergency landings are to be made.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

Figure 2:
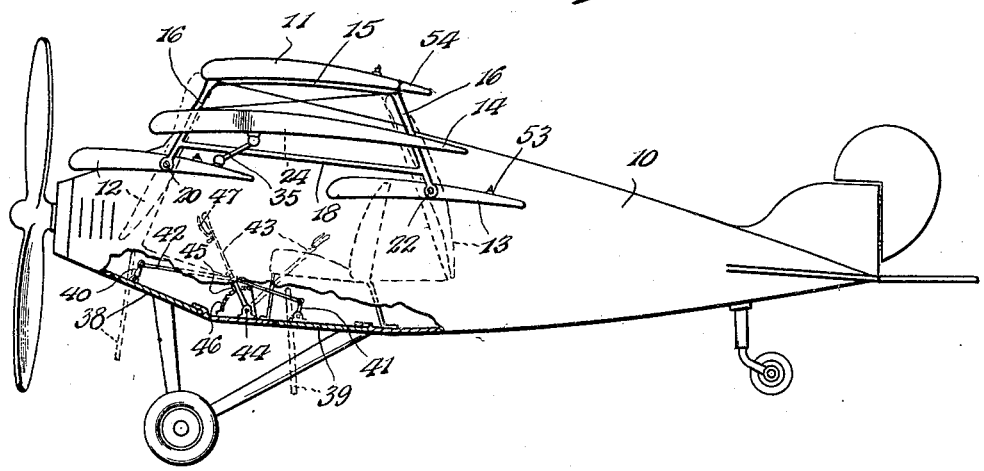
Figure 3:
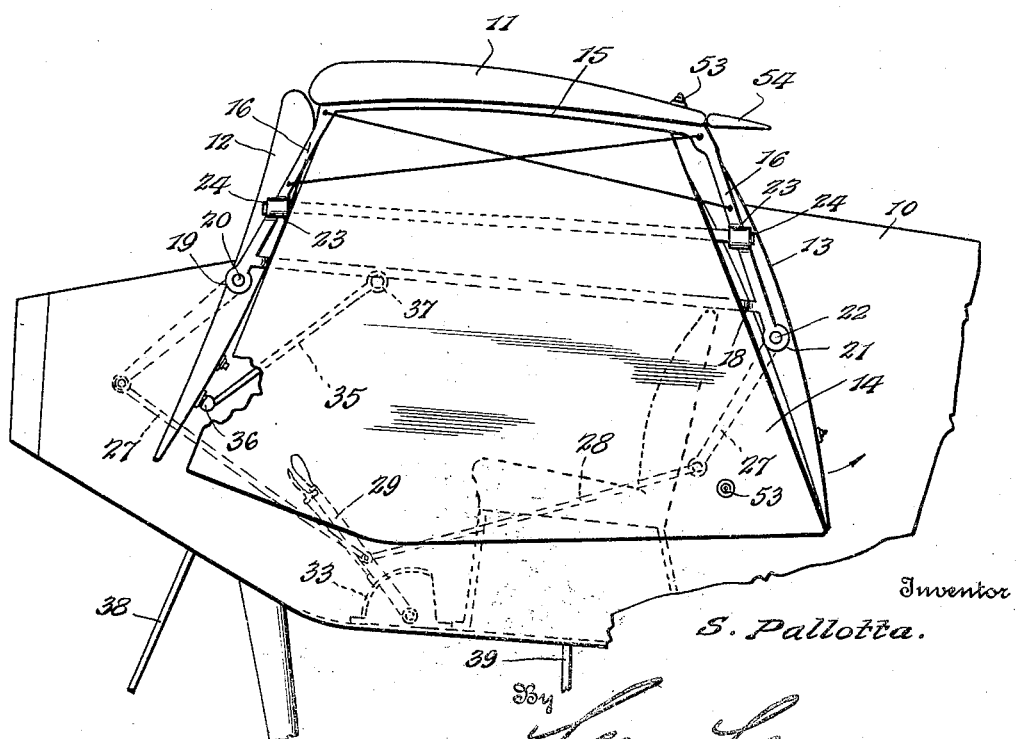

In the accompanying drawings forming part of this specification:

Figure 1 is a plan view of the airplane with the wings in normal flying position, Fig. 2 is a side elevation of the airplane with parts broken away and showing the wings closed in dotted lines and showing the trap doors open in dotted lines, Fig. 3 is a fragmentary side elevation showing the wings closed and the trap doors open to form a parachute, Fig. 4 is a front elevation of the airplane with the wings closed, Fig. 5 is a perspective view of the frame for mounting the articulated wings, Fig. 6 is a detail side elevation showing the control lever and link mechanism for opening and closing the articulated wings, Fig. 7 is a detail plan view showing a pair of the articulated wings with portions broken away to expose the structure and Fig. 8 is a cross sectional view through one of the wings taken on the line 8—8 of Fig. 7.

Referring to the drawings in which like characters of reference designate similar parts in the various views, the airplane is shown to comprise a fuselage 10 equipped with the usual tail structure, landing gear, motor and controls which may be of standard construction with the exception of slight modifications to the fuselage to permit application of the invention.

In carrying out the invention, I provide a fixed top wing 11 which may be secured in any preferred manner to the fuselage, but preferably the fuselage is built up at the sides and top to permit of the wing being rigidly secured in any preferred manner directly to the fuselage, as shown best in Fig. 4, so that the wing forms the roof of the cabin space. As best shown in Fig. 1, a plurality of articulated wings are provided at a lower level than the top fixed wing and comprise a pair of front wings 12, a pair of rear wing 13, and a pair of end wings 14. These articulated wings, in ordinary flight conditions, as best shown in Fig. 2, are mounted so that the front and rear wings may lie in the same plane on opposite sides of the fuselage at a point corresponding, for example, to the bottom wing of a biplane, while the end wings extend outwardly in the same plane, located substantially midway between the top fixed wing and front and rear articulated wings.

For mounting the articulated wings, I preferably provide a rectangular metal frame 15, best shown in Fig. 5, from the corners of which integral legs 16 extend downwardly and outwardly. The legs are braced by longitudinal rods 17 and cross rods 18. The frame 15 is preferably rigidly bolted to the internal metal structure of the fixed wing so that the frame may be considered as a unitary itegral part of said wing. The legs of the frame extend downwardly from the corners of the fixed wing, as best shown in Figs. 1, 3 and 4.

The front legs of the frame terminate in alined bearings 19 to receive the ends of the common pivot shaft 20 of both front articulated wings. Likewise, the rear legs terminate in alined bearings 21 in which are journaled the ends of the common pivot shaft 22 of both rear articulated wings. Above the terminal bearings, the legs at one end of the frame are provided with alined bearings 23 to receive the pivot shaft 24 of one of the end or lateral articulated wings, while the pair of legs at the opposite end of the frame are likewise equipped with alined bearings 25 to receive the pivot shaft 26 of the remaining end or lateral articulated wing.

It will now be clear that, by virtue of the above described pivoted mountings of the articulated wings, the front, rear and end articulated wings may be closed to co-operate with the top fixed wing in forming an open bottom box-like structure extending transversely of the fuselage. This closed or folded wing structure serves to entrap a large volume of air and function as a parachute to retard descent of the airplane in case of motor failure or desire on the part of the pilot to make a substantially vertical landing at any time.

For opening and closing the articulated wings, I provide cranks 27, best shown in Fig. 6, which are fixed to the pivot shafts of the front and rear articulated wings 12 and 13 and are connected at the free ends by a shift link 28. A lever 29 is pivoted, as shown at 30, on the floor of the fuselage or otherwise, and is pivotally connected, as shown at 31, to the link 28. When the lever is rocked forwardly, the pivot shafts will be rotated simultaneously and rock the front and rear wings to closed position while retrograde movement of the lever returns said wings to normal flying position. A dog 32 engages a rack 33 and is operated by a latch 34 in the usual manner to hold the lever stationary at either limit of its movement.

The end articulated wings 14 are simultaneously closed or opened with the front and rear articulated wings and to accomplish this, I directly connect preferably the front articulated wings with the end articulated wings by means of links 35, best shown in Figs. 1, 2 and 3, these links being pivotally and swivelly secured by universal joints 36 and 37 to the top face of each front wing, near the trailing edge thereof, and to the inner face of the adjacent end wing, near the leading edge thereof, respectively. Consequently, when the operating lever is shifted to move the front and rear articulated wings, the links 35 move the end articulated wings simultaneously with said front and rear articulated wings, to either open or closed positions.

In further carrying out the invention, it will be seen, by referring to Figs. 1 and 3, that I provide a pair of downwardly opening trap doors 38 and 39 in the bottom of the fuselage, these doors preferably being hinged near the front ends thereof to the fuselage floor in any suitable manner. The purpose of these doors is to permit, when open, of air entering the fuselage and being entrapped in large volumes in the enclosure formed by the body of the fuselage so that a quick parachute function is effected at the will of the pilot, when desired. For simultaneously operating these trap doors, I provide the trap doors with crank arms 40 and 41, respectively, these crank arms being connected by a common connecting link 42 which is pivoted to a hand lever 43 that is pivoted, as shown at 44, to the floor of the fuselage laterally of the wing operating lever 29 above described. When moved rearwardly, as indicated by the arrow-head, the lever operates through the link and cranks to rock open the doors to the dotted line position shown. Retograde movement of the lever closes the doors, as will be understood. A dog 45 engages a rack 46 and is operated by a latch 47 to hold the lever at either limit of its movement in the usual manner.

It is necessary to reinforce the internal structure of the articulated wings in order to enable them to withstand the above described opening and closing movements and strains incident thereto. As best shown in Fig. 7, therefore, I preferably provide parallel bars 48 which are passed transversely through the pivot shafts of the wings, the front articulated wings 12 being illustrated in this figure by way of example. Each bar 48 is rigidly secured at the ends to the webs of channel irons 49 and the flanges of the channel irons are rigidly secured in any preferred manner to the ribs 50 of the wing structure. Preferably, the ribs are rigidly secured to a metal frame 51 which extends entirely around the perimeter of the wing. Bosses 52 are provided on the peripheral frame to rigidly attach the pivot shaft 20. Thus it will be seen that the pivot shaft is rigidly secured to the peripheral reinforcing metal frame 51, which latter is, of course, rigidly secured to the ribs 50 and that each pair of ribs is connected on opposite sides of the pivot shaft by channel irons which in turn are connected rigidly to the pivot shaft by the bars 48.

In some instances, it may be found desirable to reduce the dead weight of the structure and to provide for this, I may equip all of the wings with valves 53, of the type used to inflate tires or of any preferred type. Helium gas or other lighter than air media may be used to inflate the wings. Inflation of the wings may be found desirable in balancing the weight of the air craft, as well as reducing the dead weight thereof, so that the craft may be trimmed to maintain lateral as well as longitudinal stability, that is, to remain on an even keel when the craft is without power and the wings are closed to form the parachute.

It is found desirable to mount the ailerons 54 on the trailing edge of the fixed wing 11 in order to maintain lateral stability of the airplane, under normal flying conditions, while at the same time the ailerons, so positioned, do not interfere with the operation of the articulated wings.

The operation, it is thought, will be readily understood from the above description. It has been brought out that the principle involved is to retard the gravitational movement of the airplane whether that be voluntary or otherwise, such retarding movement being effected by manipulation of the sustaining wing structure of the plane itself to provide a box-like structure transversely of the fuselage having the function of a parachute. It has further been brought out that the fixed and articulated wings provide adequate sustaining surfaces during normal flying conditions. It has been further brought out that at the will of the pilot, the trap doors in the fuselage may be instantly opened a moment prior to closing of the articulated wings to produce quick inflation of the fuselage.

Having thus described the invention, I claim:

1. An air craft comprising a fuselage, a fixed wing above the fuselage, a trap door in the bottom of the fuselage through which the body of the fuselage is adapted to be inflated during gravitating movement of the air craft, legs extending downwardly from the ends of the fixed wing, and front, rear and end articulated wings mounted on pivot shafts connecting said legs and adapted to be rocked to project downwardly from the fixed wing and form therewith an open box-like structure on each side of the fuselage adapted to be inflated by gravitating movement of the air craft.

2. An air craft comprising a fuselage, a fixed top wing above the fuselage, a frame rigidly secured to the interior metal framework of the fixed wing and having legs at the ends, front, rear and end articulated wings mounted on pivot shafts connecting said legs and adapted to be rocked closed to extend downwardly from the fixed wing and coact therewith in forming an open bottom box-like structure transversely of the fuselage adapted to function as a parachute, said end wings being pivoted on substantially their central axes, levers connecting the front wings to the end wings below the central axes of the end wings for swinging the end wings as a unit with the front wings, and means for swinging the front and rear wings on their pivots.

3. An air craft comprising a fuselage, a fixed top wing secured to the fuselage, a plurality of legs rigidly secured to the top wing and projecting downwardly therefrom, front and rear pivot shafts connecting said legs, end pivot shafts connecting said legs, front and rear articulated wings mounted on said front and rear shafts to rock substantially to vertical position, end articulated wings pivoted substantially on the central axis of the wings on said end shafts to rock substantially to vertical position, levers connecting the front wings to the rear wings below the central axis of the latter for movement as a unit and means for simultaneously rocking all of said articulated wings on their shafts to extend downwardly from the top wing and form an open box-like structure transversely of the fuselage adapted to function as a parachute.

4. An air craft comprising a fuselage, a fixed wing secured to the fuselage, front and rear articulated wings mounted to rock on axes disposed transversely of the fuselage, said articulated wings being at a lower level than the fixed wing, end articulated wings mounted to rock on axes extending longitudinally of the fuselage and disposed at a level intermediate the fixed wing and the front and rear articulated wings, means for simultaneously rocking all of the articulated wings to extend downwardly from the fixed wing and coact therewith in forming an open bottom box-like structure adapted to function as a parachute, and a trap door in the fuselage for inflating the fuselage by atmospheric pressure when the articulated wings are closed.

5. An air craft comprising a fuselage, a fixed wing secured to the fuselage, legs depending from the fixed wing, pivot shafts extending transversely of the fuselage carried by said legs, pivot shafts extending longitudinally of the fuselage carried by said legs in a plane intermediate the first named pivot shafts and said fixed wing, front and rear articulated wings fixed to the first-named pivot shafts, end articulated wings mounted on their central axes on the second-named pivot shafts, levers operatively connecting the end articulated wings below their central axes to certain of the other articulated wings to move as a unit therewith, and means for rocking the first-named pivot shafts to swing all of said articulated wings simultaneously to extend downwardly from the fixed wing and coact therewith in forming a parachute.

6. An air craft comprising a fuselage, a fixed wing secured to the fuselage, pivot shafts operatively connected to the fixed wing and extending along the sides and ends thereof, articulated wings carried by said shafts, bars passed through said shafts, ribs reinforcing said articulated wings and disposed on opposite sides of said bars, channel irons fixed to the ends of said bars and fixed to said ribs, and means for rocking said pivot shafts as a unit to swing said articulated wings simultaneously to extend downwardly from the longitudinal and end edges of the fixed wing to form an open bottom box-like structure adapted to function as a parachute.

7. An air craft including a fixed wing, articulated wings on the sides and ends of the fixed wing adapted to coact therewith in forming an open box-like structure adapted to function as a parachute, a fuselage forming an inflatable enclosure throughout the body thereof, a plurality of trap doors in the bottom of the fuselage, and means for simultaneously operating the trap doors to permit inflation of the entire fuselage when said articulated wings are closed.

8. An air craft including a fixed wing, articulated wings pivoted to the sides and ends of the fixed wing to swing below the fixed wing and coact with the fixed wing in forming an open bottom box-like structure adapted to function as a parachute, an inflatable fuselage between the articulated wings extending at the sides and top to said fixed wing, and a pivoted trap door in the fuselage for inflating the fuselage by atmospheric pressure.

9. An air craft including a fuselage, a fixed wing carried thereby, articulated wings pivoted to the sides and ends of the fixed wing and adapted to coact therewith in forming an open bottom box-like structure adapted to function as a parachute, each articulated wing including a pivot shaft, a peripheral metal frame extending around the edges of the wing and fixed to the shaft, bars fixed to the shaft and extending transversely thereof, channel irons having the webs fixed to the ends of the bars, and ribs on opposite sides of the channel irons fixed to the flanges of the channel irons.

In testimony whereof I affix my signature.

SANDY PALLOTTA.